(12) United States Patent
Watanabe

(10) Patent No.: US 8,677,233 B2
(45) Date of Patent: Mar. 18, 2014

(54) SHARED DOCUMENT SYSTEM THAT MANAGES IMAGES INCLUDING APPROVAL INFORMATION

(75) Inventor: Masahiro Watanabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 12/905,463

(22) Filed: Oct. 15, 2010

(65) Prior Publication Data

US 2011/0093776 A1    Apr. 21, 2011

(30) Foreign Application Priority Data

Oct. 20, 2009  (JP) ................................. 2009-241880

(51) Int. Cl.
*G06F 17/30* (2006.01)
(52) U.S. Cl.
USPC ....................................................... 715/243
(58) Field of Classification Search
USPC ....................................................... 715/243
See application file for complete search history.

(56) References Cited

U.S. PATENT DOCUMENTS

| 5,671,428 A | 9/1997 | Muranaga |
| 7,061,642 B2* | 6/2006 | Kumagai ..................... 358/1.18 |
| 2005/0203801 A1* | 9/2005 | Morgenstern et al. .......... 705/14 |
| 2006/0294053 A1* | 12/2006 | Kojima ............................ 707/1 |
| 2008/0263103 A1* | 10/2008 | McGregor et al. ............ 707/200 |

FOREIGN PATENT DOCUMENTS

| JP | 5-54036 | 3/1993 |
| JP | 2004-70614 | 3/2004 |
| JP | 2004-201051 | 7/2004 |

* cited by examiner

*Primary Examiner* — Doug Hutton, Jr.
*Assistant Examiner* — Tionna Smith
(74) *Attorney, Agent, or Firm* — Fitzpatrick, Cella, Harper & Scinto

(57) ABSTRACT

An information processing apparatus includes: an image management unit configured to manage a plurality of images; a priority information management unit configured to manage, associated with each image, priority information indicating a priority that has been instructed by a supplier of the image; an approval information management unit configured to manage, associated with each image, approval information indicating whether or not to approve sharing of the image instructed by a viewer of the image; and a selection unit configured to select images from among the plurality of images based on the priority information and the approval information.

5 Claims, 15 Drawing Sheets

| IMAGE NAME | IMAGE ID | DESIRED LAYOUT | PRIORITY | APPROVAL INFORMATION TOTAL RESULT | USER APPROVAL INFORMATION ||||
|---|---|---|---|---|---|---|---|---|
| | | | | | USER A | USER B | USER C | USER D |
| IMAGE 1 | 0 | STANDARD | 5 | 3 | - | APPROVED | APPROVED | APPROVED |
| IMAGE 2 | 1 | STANDARD | 5 | 1 | - | APPROVED | NOT APPROVED | NOT APPROVED |
| IMAGE 3 | 2 | STANDARD | 4 | 3 | - | APPROVED | APPROVED | APPROVED |
| IMAGE 4 | 3 | STANDARD | 3 | 3 | APPROVED | - | APPROVED | APPROVED |
| IMAGE 5 | 4 | STANDARD | 5 | 1 | NOT APPROVED | - | NOT APPROVED | APPROVED |
| IMAGE 6 | 5 | STANDARD | 1 | 3 | APPROVED | APPROVED | APPROVED | - |
| IMAGE 7 | 6 | STANDARD | 4 | 0 | NOT APPROVED | NOT APPROVED | NOT APPROVED | - |
| IMAGE 8 | 7 | STANDARD | 5 | 0 | NOT APPROVED | NOT APPROVED | NOT APPROVED | - |
| IMAGE 9 | 8 | FACING | 5 | 1 | - | NOT APPROVED | NOT APPROVED | APPROVED |
| IMAGE 10 | 9 | COVER PAGE | 5 | 3 | - | APPROVED | APPROVED | APPROVED |

FIG. 3

| IMAGE NAME | IMAGE ID | DESIRED LAYOUT | PRIORITY | APPROVAL INFORMATION TOTAL RESULT | USER APPROVAL INFORMATION ||||
|---|---|---|---|---|---|---|---|---|
| | | | | | USER A | USER B | USER C | USER D |
| IMAGE 1 | 0 | STANDARD | 5 | 3 | - | APPROVED | APPROVED | APPROVED |
| IMAGE 2 | 1 | STANDARD | 5 | 1 | - | APPROVED | NOT APPROVED | NOT APPROVED |
| IMAGE 3 | 2 | STANDARD | 4 | 3 | - | APPROVED | APPROVED | APPROVED |
| IMAGE 4 | 3 | STANDARD | 3 | 3 | APPROVED | - | APPROVED | APPROVED |
| IMAGE 5 | 4 | STANDARD | 5 | 1 | NOT APPROVED | - | NOT APPROVED | APPROVED |
| IMAGE 6 | 5 | STANDARD | 1 | 3 | APPROVED | APPROVED | APPROVED | - |
| IMAGE 7 | 6 | STANDARD | 4 | 0 | NOT APPROVED | NOT APPROVED | NOT APPROVED | - |
| IMAGE 8 | 7 | STANDARD | 5 | 0 | NOT APPROVED | NOT APPROVED | NOT APPROVED | - |
| IMAGE 9 | 8 | FACING | 5 | 1 | - | NOT APPROVED | NOT APPROVED | APPROVED |
| IMAGE 10 | 9 | COVER PAGE | 5 | 3 | - | APPROVED | APPROVED | APPROVED |

SHARED DOCUMENT SYSTEM THAT MANAGES IMAGES INCLUDING APPROVAL INFORMATION

BACKGROUND OF THE INVENTION

1. Field of the Invention

The present invention relates to an information processing apparatus, processing method thereof, and computer-readable storage medium.

2. Description of the Related Art

Recently, as digital cameras have become widespread, there are increasing cases where a plurality of people each participate with their own camera at a given event, and those people respectively shoot pictures of each other during the event. Also, there has been a sudden increase in cases where shot images are used by registering the images at a viewing site that supplies public albums, private albums, and so forth, and exhibiting the images to an unspecified large number of users, or to specific people.

Furthermore, there are also a large number of services for printing albums from those sites. For example, technology is known whereby selection of images to be used in an album is performed according to a popularity vote by viewers (Japanese Patent Laid-Open No. 2004-070614). Technology is also known whereby approval by a concerned person is required in order for a specific operation to be performed on a shared document (Japanese Patent Laid-Open No. 05-54036).

Conventionally, selection of images to be used in an album or the like is entrusted to the creator of the album, and so the wishes of both the supplier of the images and the wishes of viewers of the images are not reflected.

Also, with increased capacity and reduced price of recording devices such as digital camera memory, hard disks, and the like, there is an increased tendency to shoot a large amount of images. Therefore, much time and effort is involved in selecting images to be used in an album or the like from among a large amount of images after shooting. Furthermore, there has been no consideration of, when selecting the images to be used in an album, assigning a multi-valued evaluation to each image and using that evaluation to perform selection.

SUMMARY OF THE INVENTION

The present invention provides technology enabling the creation of a shared document in which the wishes of both a supplier of images and the wishes of viewers of the images are reflected.

According to a first aspect of the present invention, there is provided an information processing apparatus, comprising: an image management unit configured to manage a plurality of images; a priority information management unit configured to manage, associated with each image managed by the image management unit, priority information indicating a priority that has been instructed by a supplier of the image; an approval information management unit configured to manage, associated with each image managed by the image management unit, approval information indicating whether or not to approve sharing of the image instructed by a viewer of the image; and a selection unit configured to select images from among the plurality of images managed by the image management unit, based on the priority information and the approval information.

According to a second aspect of the present invention, there is provided a processing method in an information processing apparatus, the method comprising: managing, associated with each of a plurality of managed images, priority information indicating a priority that has been instructed by a supplier of the image; managing, associated with each managed image, approval information indicating whether or not to approve sharing of the image instructed by a viewer of the image; and selecting images from among the plurality of managed images, based on the priority information and the approval information.

According to a third aspect of the present invention there is provided a computer-readable storage medium storing a computer program for causing a computer to function as: an image management unit configured to manage a plurality of images; a priority information management unit configured to manage, associated with each image managed by the image management unit, priority information indicating a priority that has been instructed by a supplier of the image; an approval information management unit configured to manage, associated with each image managed by the image management unit, approval information indicating whether or not to approve sharing of the image instructed by a viewer of the image; and a selection unit configured to select images from among the plurality of images managed by the image management unit, based on the priority information and the approval information.

Further features and aspects of the present invention will become apparent from the following description of exemplary embodiments with reference to the attached drawings.

BRIEF DESCRIPTION OF THE DRAWINGS

FIG. 3 shows an example layout of a data table.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
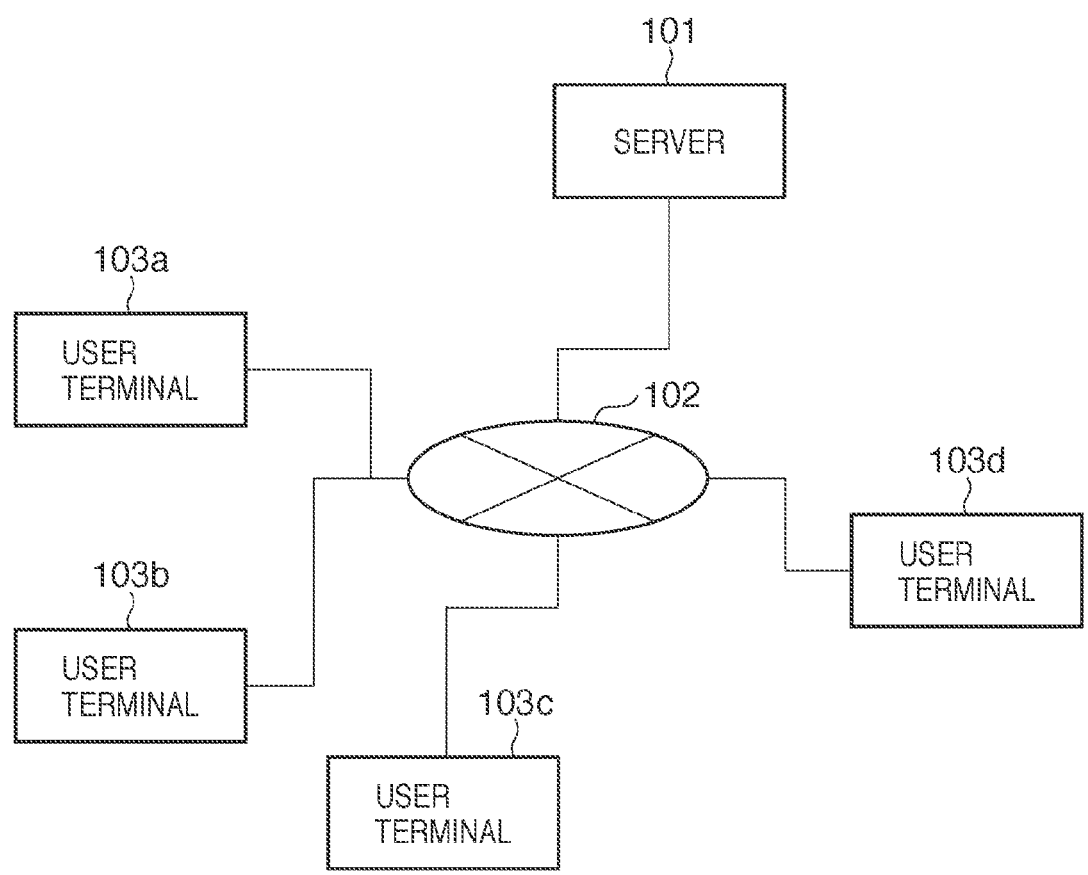
FIG. 1 shows an example of the overall configuration of a shared document creation system configured with an information processing apparatus according to an embodiment of the present invention.

FIG. 1 shows an example of the overall configuration of a shared document creation system configured with an information processing apparatus (server 101) according to an embodiment of the present invention. In the present embodiment, by way of example, a case of creating an album as a shared document will be described.

In the shared document creation system, the server 101 and a plurality of user terminals 103 (103a to 103d) are connected via a network 102 that is configured from a WAN (Wide Area Network), the Internet, or the like.

The server 101 supplies images to a user terminal 103 (103a to 103d). Also, the server 101 creates an album using the images based on instructions from the user terminal 103.

The user terminal 103 (103a to 103d) is an apparatus operated by a user (for example, such as an individual user, a photographer, a bookbinding worker, or the like). The users who use the user terminal 103 are broadly divided into image suppliers who supply images (below, also abbreviated as suppliers), and image viewers who view images that have been supplied (below, also abbreviated as viewers).

Here, an example of the functional configuration in the server 101 and the user terminals 103 shown in FIG. 1 is described with reference to FIG. 2.

The server 101 is configured to include, as functional configurations, a server-side communication unit 11, a server-side display unit 12, a server-side input unit 13, a server-side storage unit 14, and a server-side control unit 15.

The server-side communication unit 11, for example, is configured with a network card or the like, and functions as a communication interface that controls communication between the server 101 and other apparatuses (in the present embodiment, the user terminals 103).

The server-side display unit 12, for example, is configured with a display or the like, and displays various information. The server-side input unit 13, for example, is configured with a keyboard, a mouse, and so forth, and inputs instructions from a user into an apparatus.

The server-side storage unit 14, for example, is configured with an HDD (Hard Disk Drive) or the like, and functions as a storage apparatus that stores various data. In the server-side storage unit 14, various programs such as an operating system and applications are stored, and also setting information and the like required when executing various processing is stored.

Here, for example, in addition to a plurality of images, data tables, image selection methods, album page data, and so forth are stored in the server-side storage unit 14. As shown in FIG. 3, a data table holds image IDs, desired layout information, and so forth. Moreover, also stored in the data table is information indicating an image priority assigned by a user (supplier) (referred to below as priority information), information indicating approval or denial of image sharing (use in an album) assigned by respective users (viewers) (referred to below as approval information), approval information total results, and so forth.

The server-side control unit 15, for example, is configured with a CPU and memories such as a ROM (Read Only Memory) and a RAM (Random Access Memory), and performs central control of processing in the server 101. Various processing in the server 101, for example, is realized by the CPU reading and executing programs that have been stored in the server-side storage unit 14, using a memory as a work area.

Here, the server-side control unit 15 includes an image management unit 16, a priority information management unit 17, an approval information management unit 18, a layout information management unit 19, an image selection unit 20, a shared document creation unit 21, and a display screen creation unit 22.

The image management unit 16 manages one or a plurality of images. This management, for example, is performed using the server-side storage unit 14. The priority information management unit 17 assigns priority information to each of the images managed by the image management unit 16, and manages that priority information. That is, the priority information is managed with the images being associated with the priority information. The approval information management unit 18 assigns approval information to each of the images managed by the image management unit 16, and manages that approval information. That is, the approval information (information indicating approval or denial) is managed with the images being associated with the approval information. The layout information management unit 19 assigns layout information to each of the images managed by the image management unit 16, and manages that layout information. That is, the layout information (information indicating approval or denial) is managed with the images being associated with the layout information. The image selection unit 20 selects images that satisfy a condition from among the plurality of images based on the priority information, the approval information, and so forth. The shared document creation unit 21 creates a shared document such as an album based on the images that were selected by the image selection unit 20. When creating a shared document, the shared document creation unit 21, for example, arranges the images at predetermined positions in the shared document based on the layout information. The display screen creation unit 22 creates a display screen supplied to the user terminal 103.

Each user terminal 103 is configured including, as functional configurations, a communication unit 31, a display unit 32, an input unit 33, a storage unit 34, and a control unit 35. The communication unit 31 serves a similar function as the server-side communication unit 11, the display unit 32 serves a similar function as the server-side display unit 12, the input unit 33 serves a similar function as the server-side input unit 13, the storage unit 34 serves a similar function as the server-side storage unit 14, and the control unit 35 serves a similar function as the server-side control unit 15, so a description thereof may be omitted.

Here, the input unit 33, for example, is configured with a keyboard, a mouse, and the like, and also a scanner, a digital camera, or the like for capturing images, and inputs instructions from a user and images into the apparatus.

Figure 2:
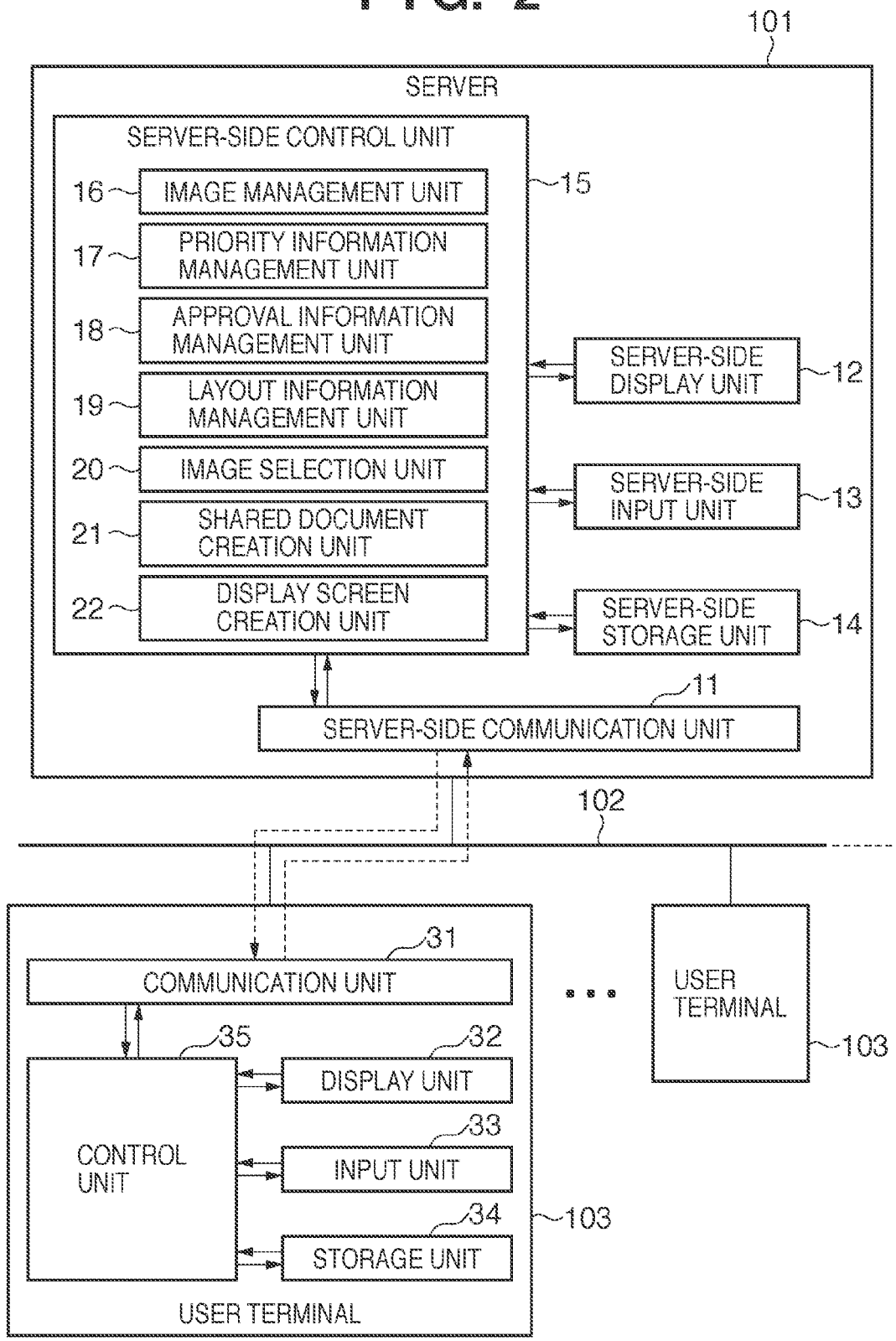
FIG. 2 shows an example of the functional configuration of a server 101 and user terminals 103 shown in FIG. 1.

Above, an example of the functional configurations of the server 101 and the user terminals 103 according to the present embodiment is described, but the configurations shown in FIG. 2 are only an example, and not a limitation. For example, the server-side display unit 12 is not an essential constituent element, and may be omitted.

Next is a description of an example flow of processing performed in the shared document creation system shown in FIG. 1. First, by way of example, is a description of a flow of processing when creating an album, with reference to FIG. 4. In this description, notification of a user ID and password of each user is given in advance through electronic mail, postal mail, or the like from a system manager.

First, a user accesses the server 101 by operating a user terminal 103 (step S101). At this time, the user terminal 103 transmits authentication information to the server 101. After receiving the authentication information, the server 101, in the server-side control unit 15, performs user authentication using the authentication information that was transmitted and genuine authentication information that has been registered in advance (step S102). Here, for the sake of convenience of description, it is assumed that the user authentication was successful.

Figure 5:
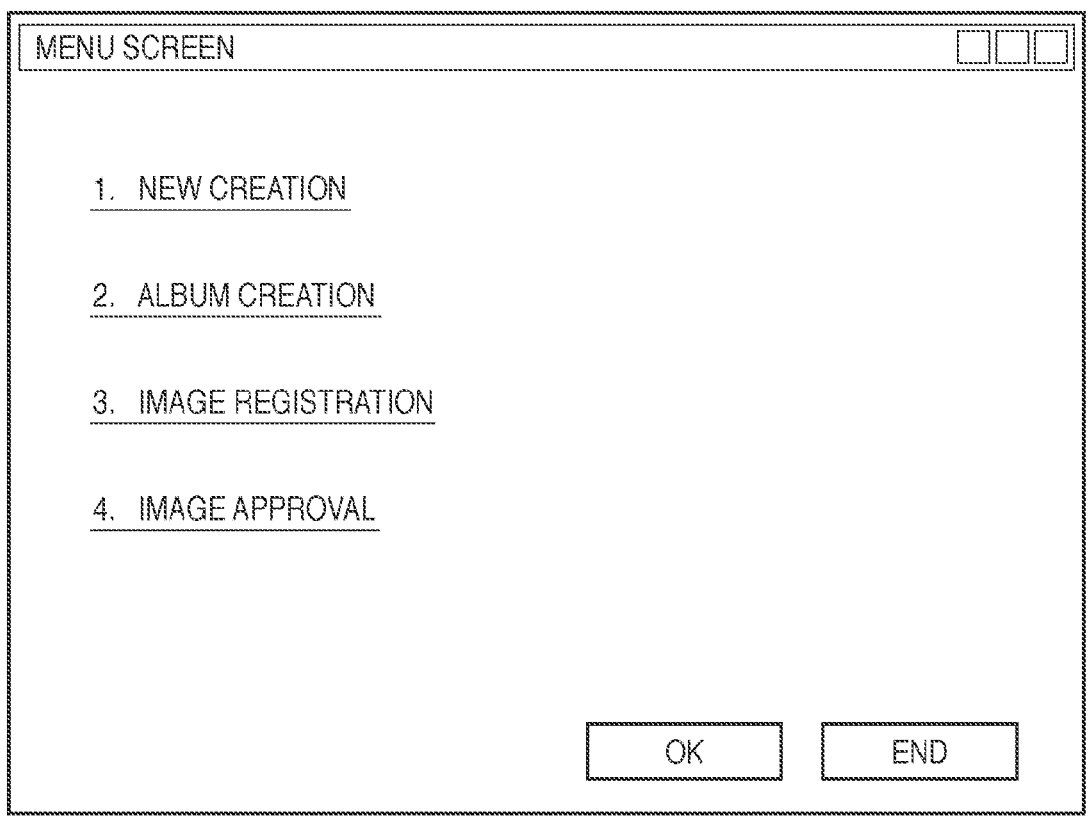
FIG. 5 shows an example layout of a menu screen.

After the user authentication, the server 101, in the server-side communication unit 11, transmits data for menu screen display to the user terminal 103 (step S103). Then, the user terminal 103 displays a menu screen shown in FIG. 5 in the display unit 32 (step S104). As shown in FIG. 5, a menu including "new creation", "album creation", "image registration", and "image approval" is provided in the menu screen. Here, the user selects a desired menu item using a mouse or the like.

The user selects any of the menu items via the input unit 33 and instructs "OK" for that selection. Thus, instruction information of the selected menu item is transmitted from the user terminal 103 to the server 101 (step S105).

Here, the server 101, in the server-side communication unit 11, receives the instruction information that was transmitted (step S106). Then, the server 101, in the server-side control unit 15, judges that instruction information (step S107), and switches and executes processing based on the result of that judgment (steps S108 to S111). After the processing in steps S108 to S111, if subsequent processing is to be performed (NO in step S112), the flow of processing returns to the processing in step S103. On the other hand, if there is no subsequent processing to be performed (YES in step S112), here this processing ends.

New Creation Processing

Figure 4:
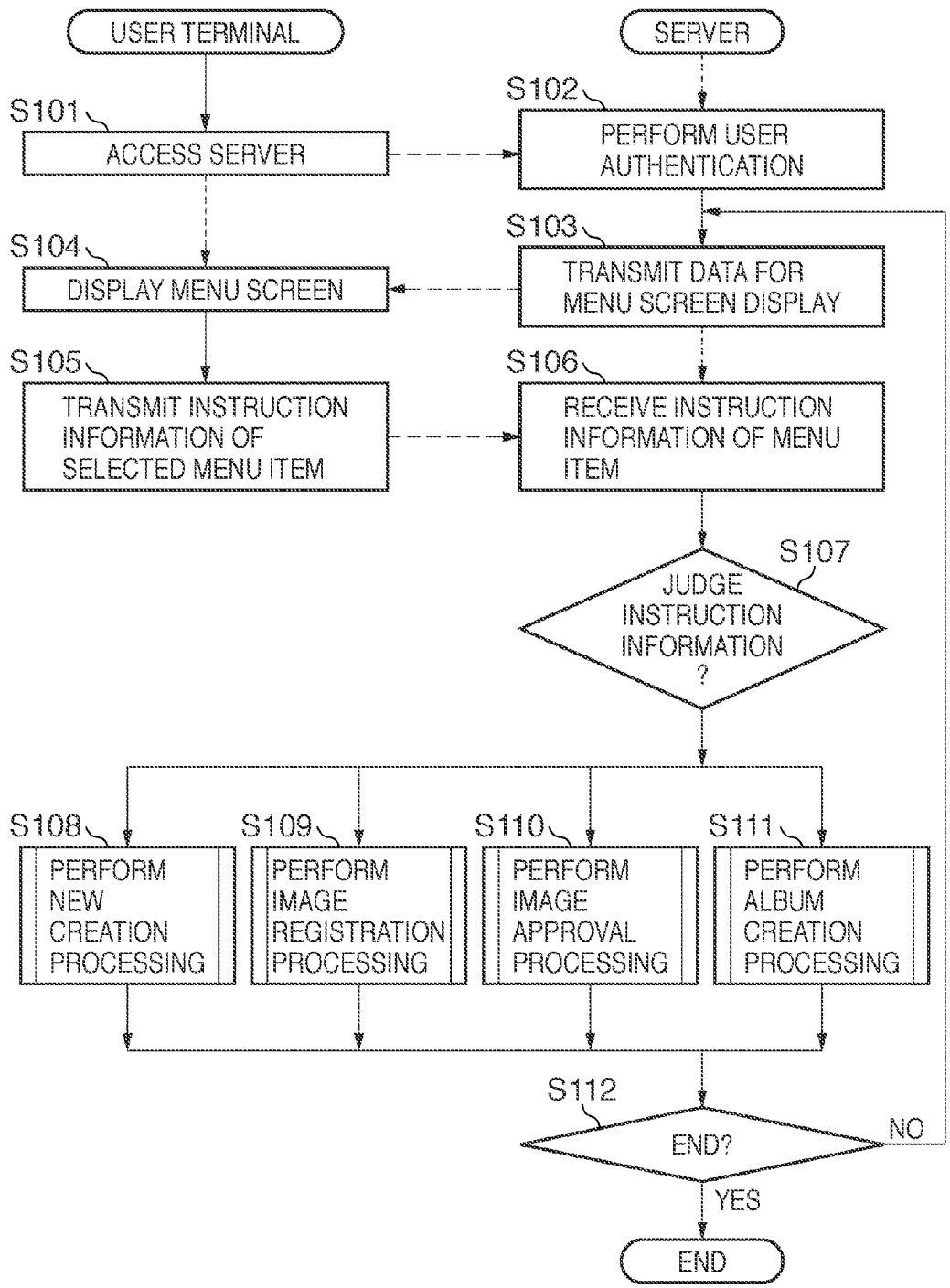
FIG. 4 is a flowchart that shows an example flow of processing performed when creating an album.
Figure 6:
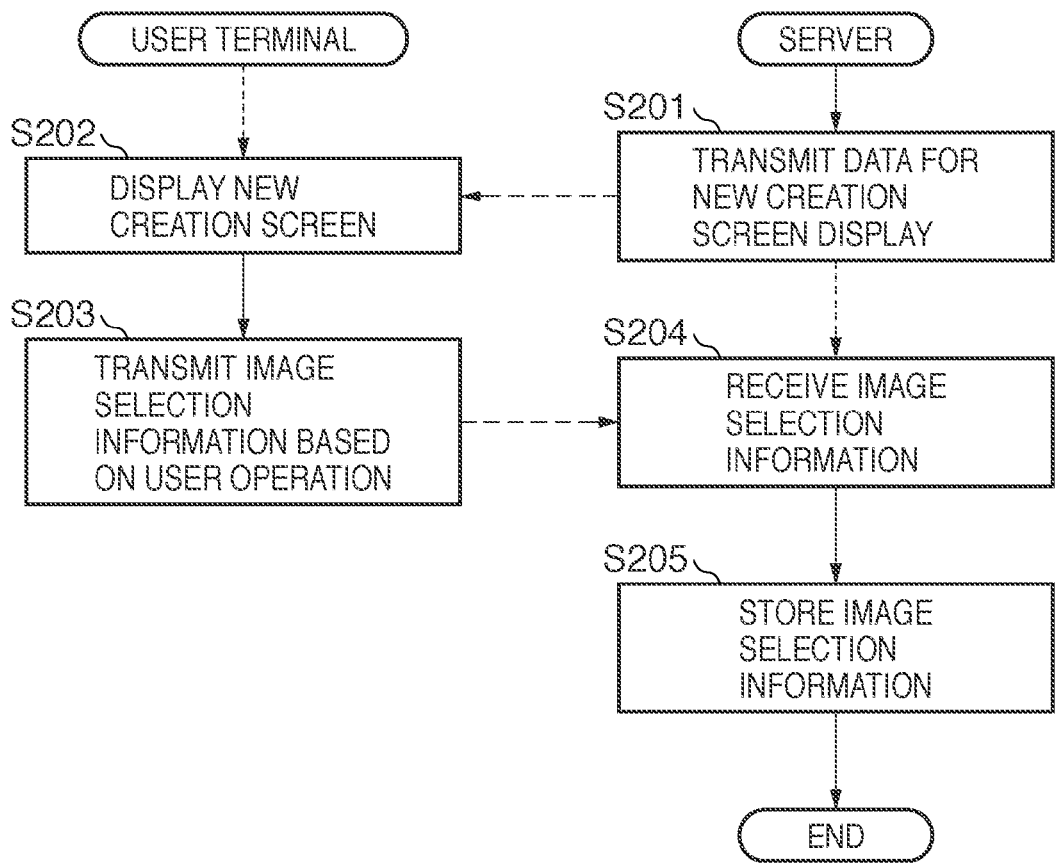
FIG. 6 is a flowchart that shows an example flow of processing performed when creating an album.

Next, a description is given of an example flow of the new creation processing in step S108 shown in FIG. 4, with reference to FIG. 6. This processing is started when the user (supplier) has selected "new creation" from the menu screen shown in FIG. 5.

Figure 7:
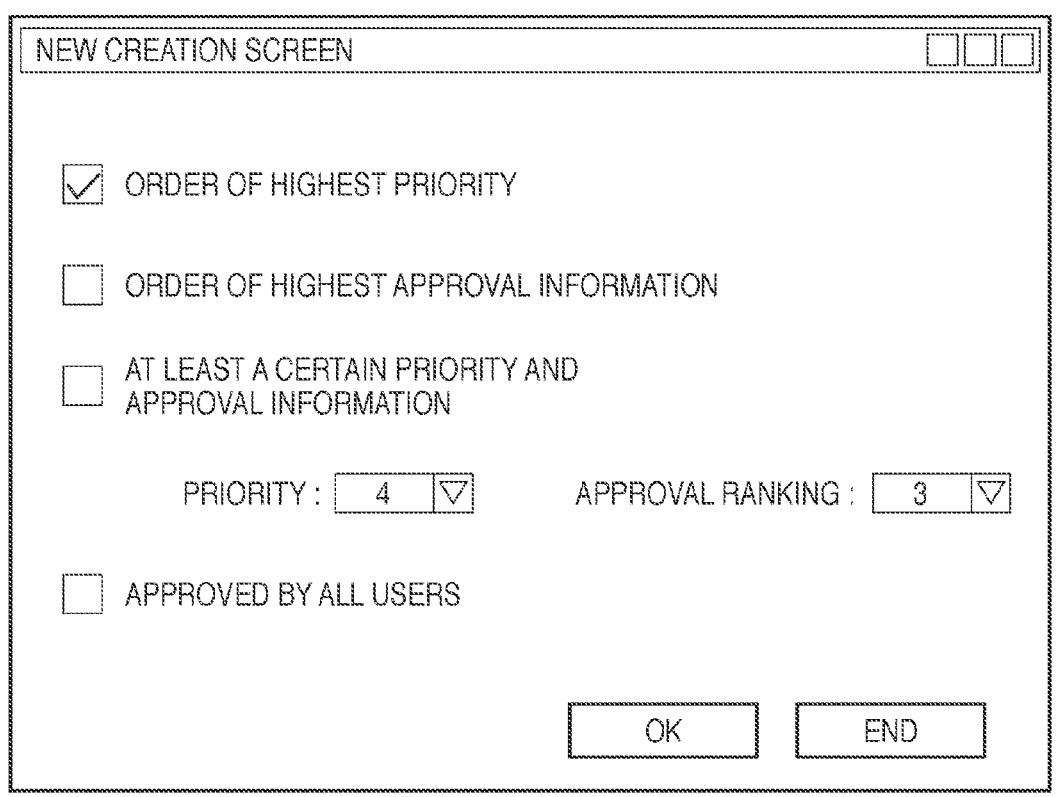
FIG. 7 shows an example layout of a new creation screen.

When this processing is started, the server 101, in the server-side communication unit 11, transmits data for new creation screen display to the user terminal 103 (step S201). Then, the user terminal 103 displays a new creation screen shown in FIG. 7 in the display unit 32 (step S202). As shown in FIG. 7, a plurality of check boxes for selecting an image selection method are provided in the new creation screen. In the case of FIG. 7, "order of highest priority", "order of highest approval information", "at least a certain priority and approval information", and "approved by all users" are provided, and a check is entered in the check box provided together with "order of highest priority".

The user selects any of the check boxes via the input unit 33, and instructs "OK" for that selection. Thus, image selection information (information indicating image selection method) corresponding to the selected check box is transmitted from the user terminal 103 to the server 101 (step S203).

Here, the server 101, in the server-side communication unit 11, receives the image selection information that was transmitted from the user terminal 103 (step S204), and stores the received image selection information in the server-side storage unit (step S205). Then this processing ends.

Image Registration Processing

Figure 8:
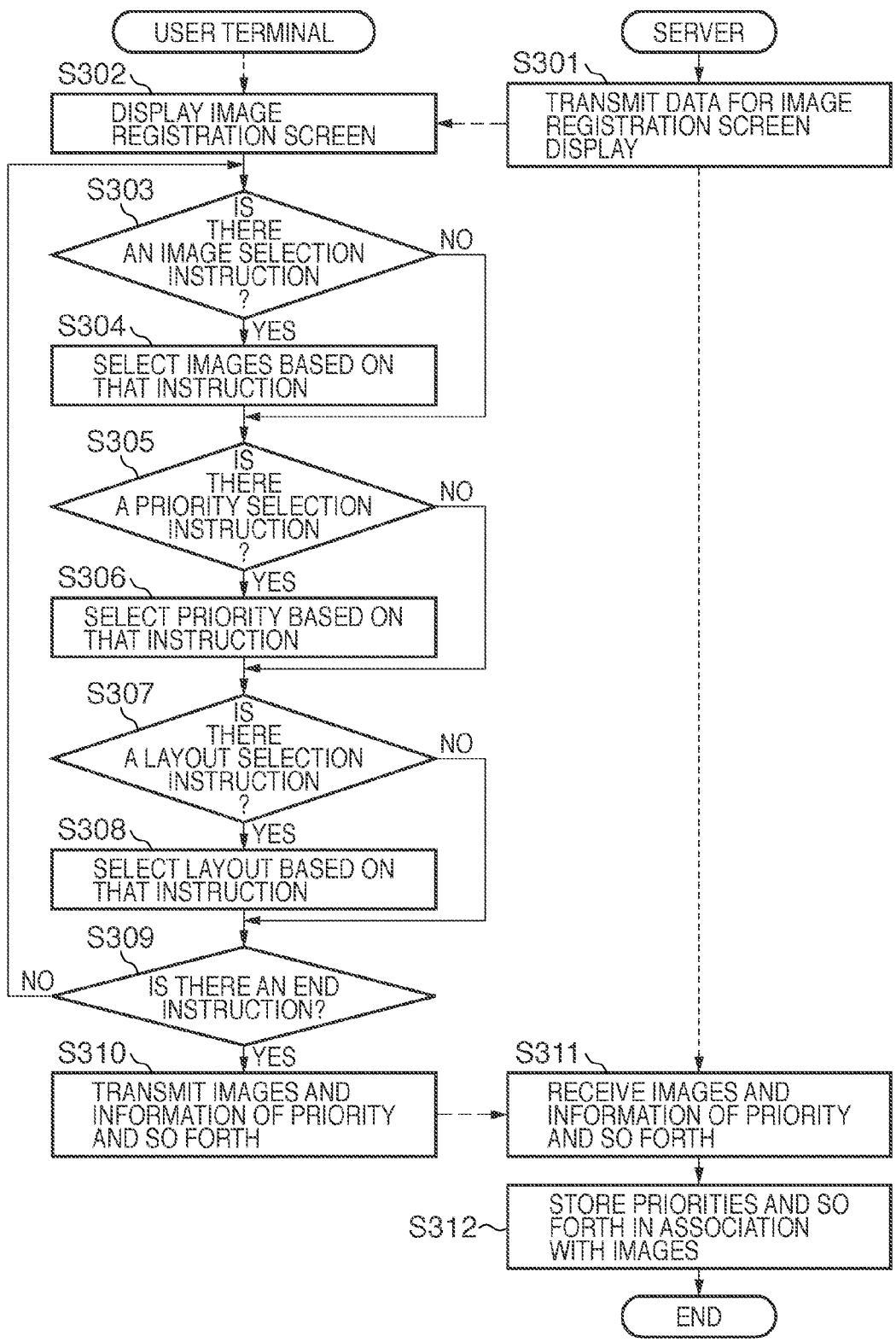
FIG. 8 is a flowchart that shows an example flow of processing performed when creating an album.

Next, a description is given of an example flow of the image registration processing in step S109 shown in FIG. 4, with reference to FIG. 8. This processing is started when the user (supplier) has selected "image registration" from the menu screen shown in FIG. 5.

Figure 9:
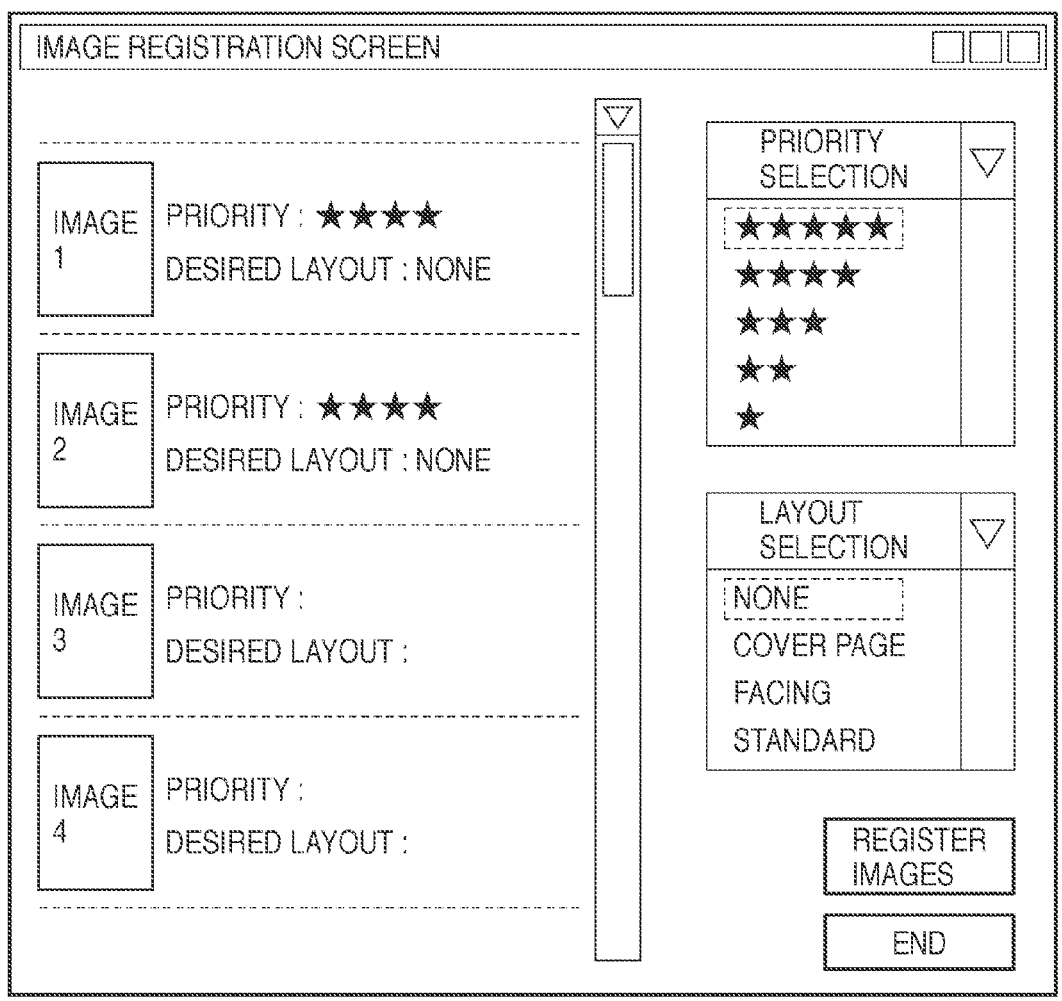
FIG. 9 shows an example layout of an image registration screen.

When this processing is started, the server 101, in the display screen creation unit 22, creates data for image registration screen display, and in the server-side communication unit 11, transmits the created data to the user terminal 103 (step S301). Then, the user terminal 103 displays an image registration screen shown in FIG. 9 in the display unit (step S302). As shown in FIG. 9, a list of images is provided in the image registration screen. Here, the user selects images desired to be registered via the input unit 33 (after YES in step S303, step S304), and inputs the priority information thereof (after YES in step S305, step S306). The images may be images that were captured using a scanner or a digital camera, or may be images that were converted to data in advance. Five levels of priority from 1 to 5 are provided, for example, and in this case, priority is indicated by a number of stars (a greater number of stars indicates higher priority).

In the image registration screen, in addition to assigning priority information, an album layout is selected. When the user desires to change the layout, for example (YES in step S307), the user selects the desired layout from a list of layouts via the input unit 33 (step S308).

Afterward, when the user instructs ending via the input unit 33 (YES in step S309), the selected images and information regarding priority and so forth (sometimes also including layout information) are transmitted from the user terminal 103 to the server 101 (step S310).

Here, the server 101, in the server-side communication unit 11, receives the images and the information regarding priority and so forth that were transmitted from the user terminal 103 (step S311). Then, in the image management unit 16 and the priority information management unit 17, the received images and their priorities are stored associated with each other in the server-side storage unit 14 (step S312). Also, if layout information has been transmitted, the server 101, in the layout information management unit 19, stores the received images and their layout information associated with each other in the server-side storage unit 14. Then this processing ends.

Image Approval Processing

Figure 10:
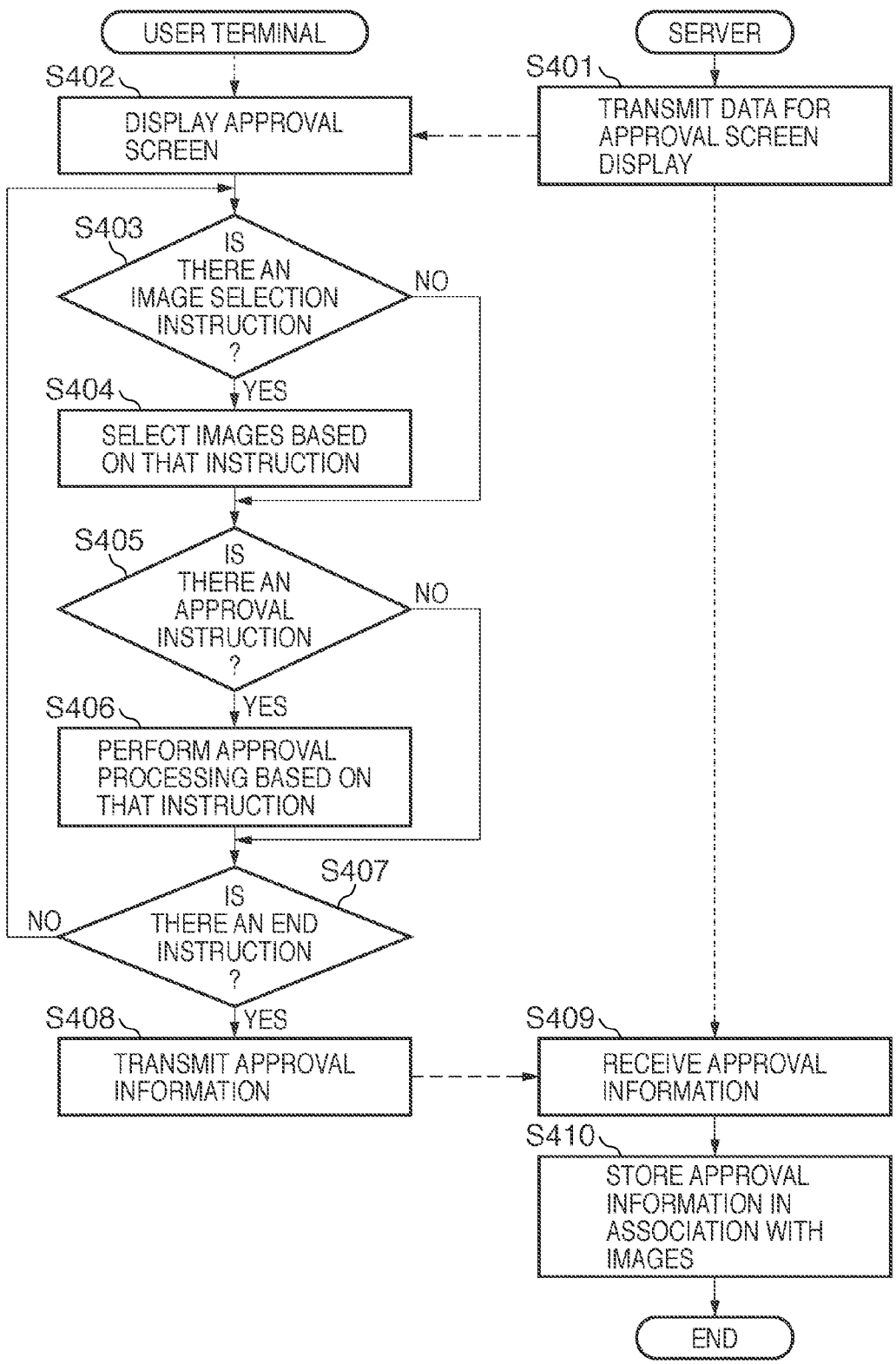
FIG. 10 is a flowchart that shows an example flow of processing performed when creating an album.

Next, a description is given of an example flow of the image approval processing in step S110 shown in FIG. 4, with reference to FIG. 10. This processing is started when the user (viewer) has selected "image approval" from the menu screen shown in FIG. 5.

Figure 11:
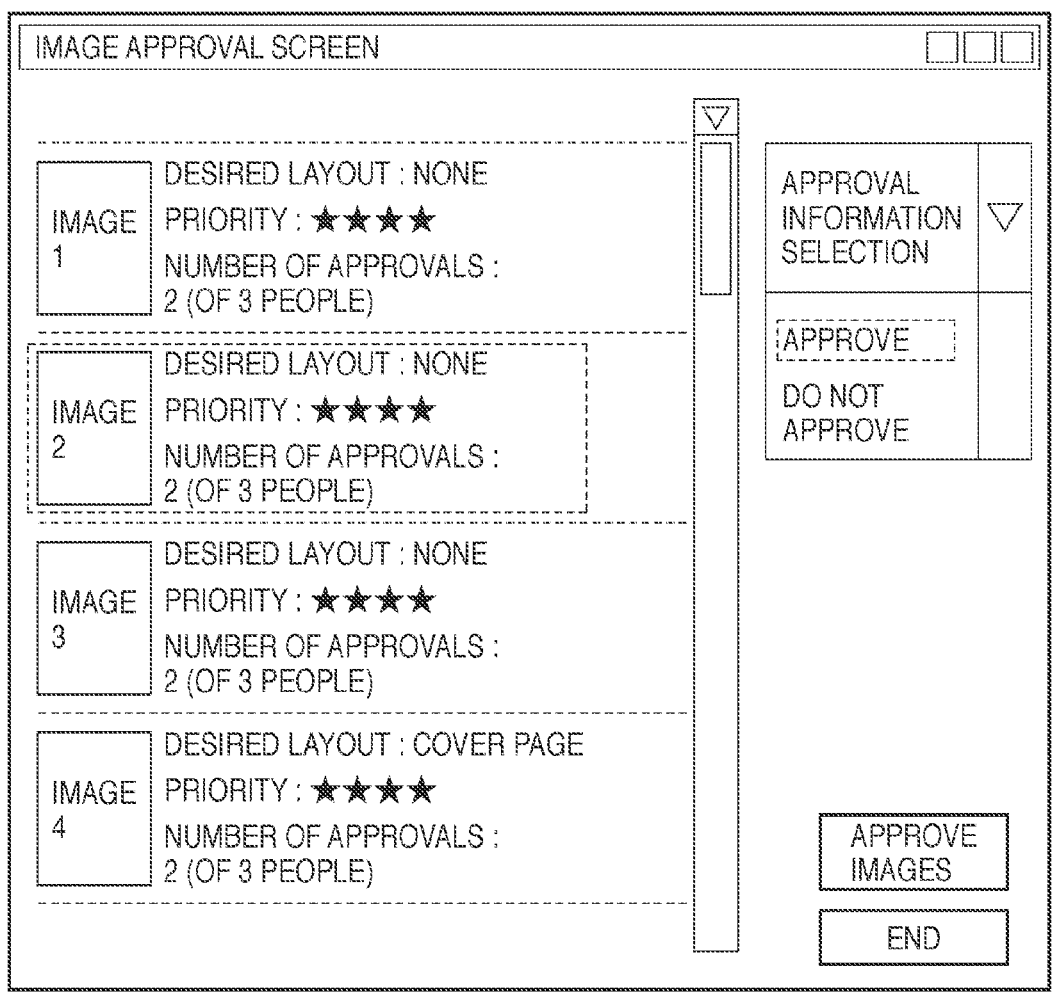
FIG. 11 shows an example layout of an image approval screen.

When this processing is started, the server 101, in the display screen creation unit 22, creates data for image approval screen display, and in the server-side communication unit 11, transmits the created data to the user terminal 103 (step S401). Then, the user terminal 103 displays an image approval screen shown in FIG. 11 in the display unit 32 (step S402). As shown in FIG. 11, the image approval screen includes images, and priority information, approval information total results, information regarding layout, and so forth corresponding to the respective images. Also, in the image approval screen, the images are displayed sorted based on the image selection method that was selected by the user in the new creation processing described above. In the case of FIG. 11, the image display order has been set to "order of highest priority".

Here, the user instructs, via the input unit 33, to approve or deny use (that is, shared use) in the album for each image being displayed in the list in this screen. For example, the user can deny usage of an image in which the user is making a strange face. Note that a configuration may also be adopted in which instead of approval or denial, input by priority is sought, and the user can input a high priority for an image that the user desires to be used very much. Here, the user selects images via the input unit 33 (after YES in step S403, step S404), and inputs approval or denial (after YES in step S405, step S406). Afterward, when the user instructs ending via the input unit 33 (YES in step S407), approval information associated with images is transmitted from the user terminal 103 to the server 101 (step S408).

Here, the server 101, in the server-side communication unit 11, receives the approval information that was transmitted from the user terminal 103 (step S409). Then, in the approval information management unit 18, the received approval information is stored associated with the images in the server-side storage unit 14 (step S410). At this time, the approval information management unit 18 also stores the approval information total results for each user in the server-side storage unit 14. Then this processing ends.

Image Creation Processing

Figure 12:
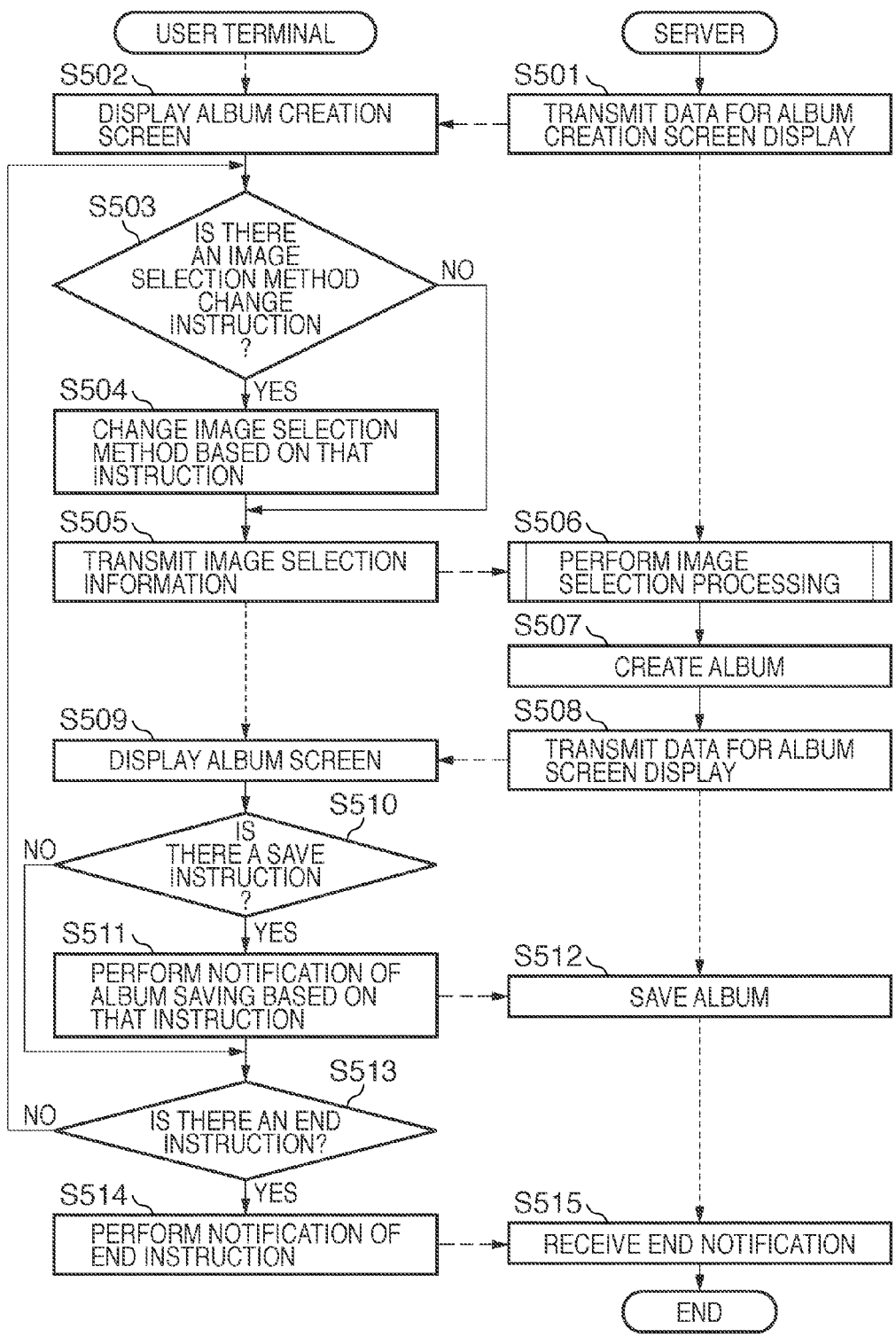
FIG. 12 is a flowchart that shows an example flow of processing performed when creating an album.

Next, a description is given of an example flow of the album creation processing in step S111 shown in FIG. 4, with reference to FIG. 12. This processing is started when the user (supplier) has selected "album creation" from the menu screen shown in FIG. 5.

Figure 13:
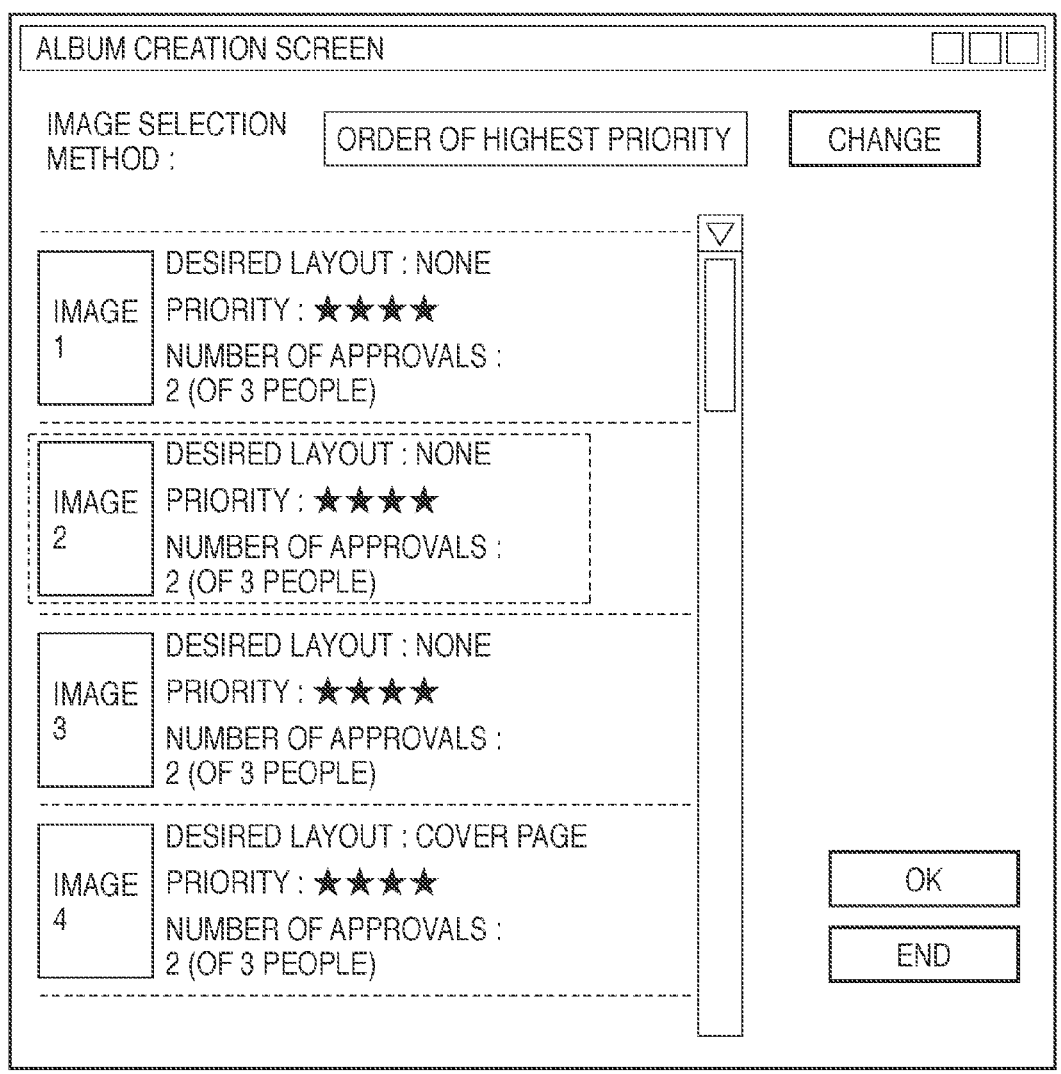
FIG. 13 shows an example layout of an album creation screen.

When this processing is started, the server 101, in the display screen creation unit 22, creates data for album creation screen display, and in the server-side communication unit 11, transmits the created data to the user terminal 103 (step S501). Then, the user terminal 103 displays an album creation screen shown in FIG. 13 in the display unit 32 (step S502). As shown in FIG. 13, the album creation screen includes images, and priority information, approval information total results, information regarding layout, and so forth corresponding to the respective images. This screen also includes a change button or the like for changing the image selection method. In the case of FIG. 13, the image selection method that was selected by the user in the above new creation processing is shown.

Here, when the user has changed the image selection method via the input unit 33 (YES in step S503), the image selection method is changed based on that operation (step S504), and then the image selection information is transmitted from the user terminal 103 to the server 101 (step S505). If the image selection method has not been changed (NO in step S503), the image selection information is transmitted as-is to the server 101 (step S505).

Here, the server 101, in the server-side communication unit 11, receives the image selection information that was transmitted from the user terminal 103, and performs image selection processing based on that information (step S506). The details of the image selection processing will be described below, but for example, any images are selected from among the plurality of images based on the priority information and the approval information. Thus, the images to be used in the album are set. Then, the server 101, in the shared document creation unit 21, creates the album based on the images that have been set (step S507). Here, when images are selected by the image selection method that was designated by the user, and layout information corresponding to those images has already been registered, the server 101 arranges the images on each page of the album based on that layout information. When there is a cover page or the like, the number of images may be undesirably limited. In this case, if there are a plurality of images having the same priority, the user may be prompted to instruct which of those images to select.

A function for adjusting the layout based on the priority information and the result of the approval information total may also be provided. For example, a configuration may be adopted in which the layout is made smaller for images having a higher priority and a smaller approval information total result, and the layout is made larger or set to a layout of facing images for images that have both a high priority and a large approval information total result.

When album creation is finished, the server 101, in the display screen creation unit 22, creates data for album screen display, and in the server-side communication unit 11, transmits the created data to the user terminal 103 (step S508). Then, the user terminal 103 displays an album screen in the display unit 32 (step S509). The user refers to the album screen and confirms the created album page data. When the result of the confirmation is to save the created album (YES in step S510), the user instructs saving of the album via the input unit 33. Then, notification of album saving is performed from the user terminal 103 to the server 101 (step S511). In response, the server 101 stores the album in the server-side storage unit 14 (step S512).

Then, when the user instructs ending via the input unit 33 (YES in step S513), an ending notification is transmitted from the user terminal 103 to the server 101 (step S514). The server 101, in the server-side communication unit 11, receives the ending notification that was transmitted from the user terminal 103 (step S515). Thus, this processing ends.

Figure 14:
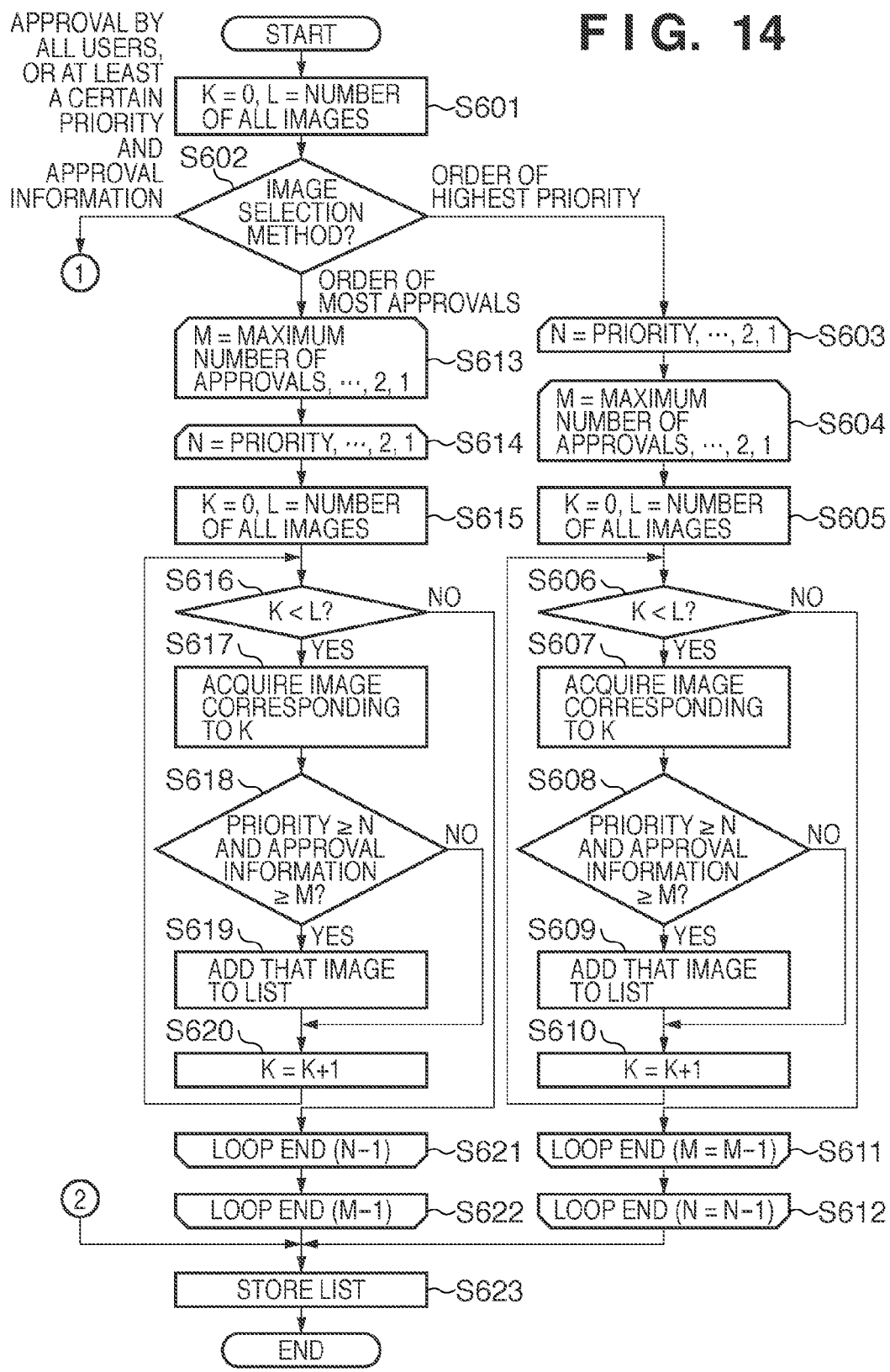
FIG. 14 is a flowchart that shows an example flow of processing performed when creating an album.
Figure 15:
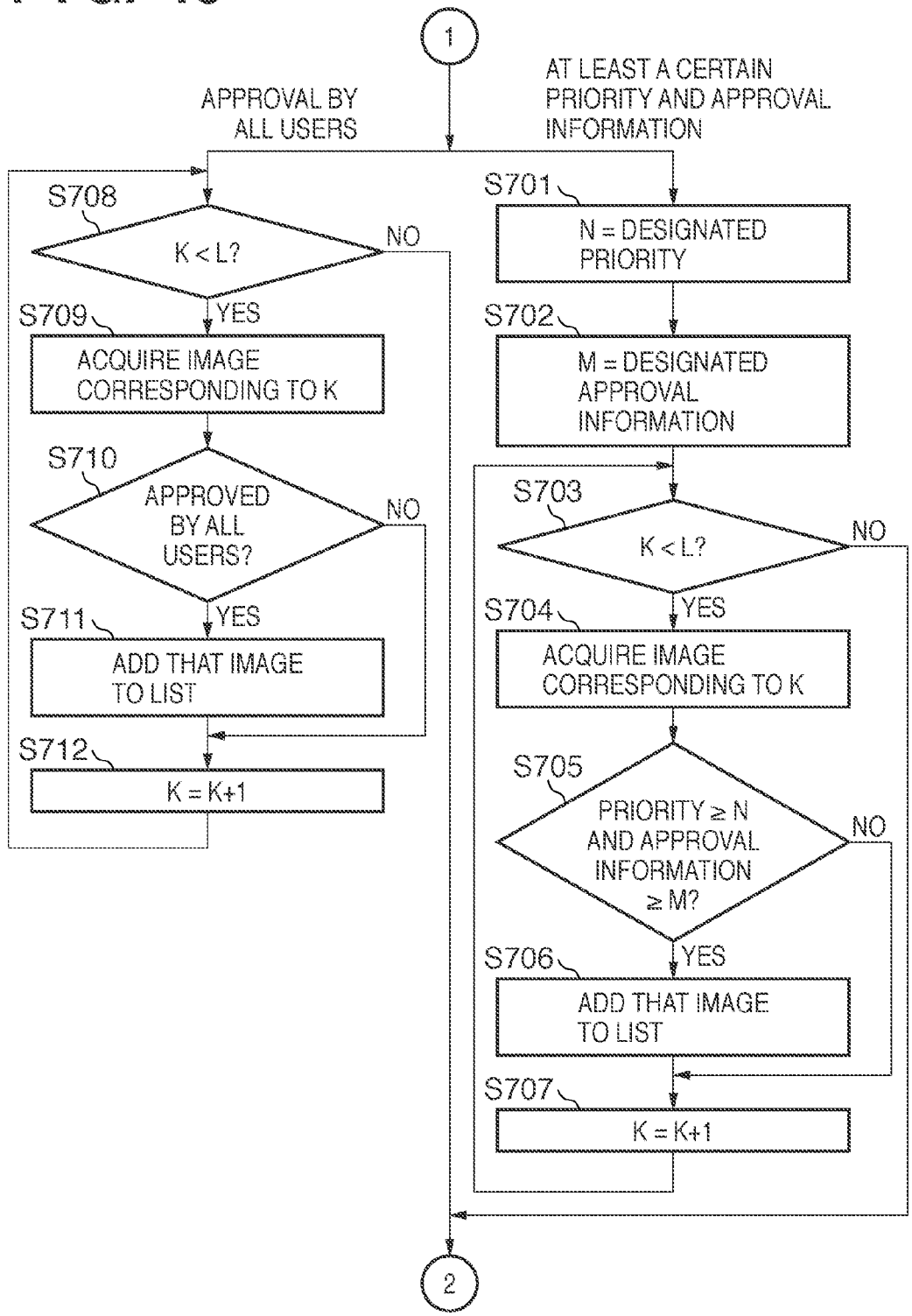
FIG. 15 is a flowchart that shows an example flow of processing performed when creating an album.

Next, a description is given of an example flow of the image selection processing in step S506 shown in FIG. 12, with reference to FIGS. 14 and 15. The image selection processing shown in FIGS. 14 and 15 is mainly performed in the image selection unit 20 of the server 101. As described above, image selection methods include "order of highest priority", "order of most approvals", "approved by all users", and so forth. The method according to which images are selected depends on the designation by the user via the user terminal 103.

First, the server 101 sets "0" as a variable K, and sets the number of all images stored in the server-side storage unit 14 (referred to below as the number of all images) as a variable L (step S601). The variable K is used as a loop counter.

The server 101 switches and performs subsequent processing according to the image selection method that has been designated for the album to be created. Specifically, processing is switched according to which of "order of highest priority", "order of most approvals", "images approved by all users", and "images having at least a certain priority and approval information" has been designated.

Here, when "order of highest priority" has been designated (order of highest priority in step S602), the server 101 sets the priority number (in this case, 5) as a variable N, and sets the maximum of the approval total result (referred to below as the maximum approvals number) as a variable M. Thereafter, the server 101 repeatedly executes the processing of steps S603 to S612, decrementing the value of N by "1" until that value reaches "0". Also, the server 101 repeatedly executes the processing of steps S604 to S611, decrementing the value of M by "1" until that value reaches "0". If, for example, a user other than the image supplier performs approval, the value of the variable M becomes the number of all users minus 1 (in this case, 3).

When this loop processing is started, the server 101 sets "0" as the variable K and sets the number of all images as the variable L (step S605). If the variable K is smaller than the variable L (YES in step S606), an image having an image ID that corresponds to the variable K is acquired (step S607). Here, if the priority of the acquired image is at least as high as the variable N, and the approval information total result of the acquired image is at least M (YES in step S608), that image is added to the list (step S609), and then the variable K is incremented by "1" (step S610). Otherwise (NO in step S608), the variable K is incremented by "1" without adding the image to the list (step S610). Then, the flow again returns to the processing in step S606, and the processing of steps S606 to S610 is repeatedly executed.

During the processing loop in steps S606 to S610, when the variable K and the variable L have the same value (NO in step S606), the variable M is decremented by "1", and processing is performed again from step S605. Moreover, when the processing of steps S604 to S611 is repeatedly executed, and the value of the variable M becomes "0", the variable N is decremented by "1", and processing is performed again from step S604. Thus, from among images having a high priority, images having a high approval information total result are added in order to the list. In the case of the table shown in FIG. 3, images are added to the list in the order of the following image names: image 1, image 10, image 2, image 5, image 9, image 8, image 3, image 7, image 4, image 6. When the processing up to step S612 ends, the server 101 stores this list (step S623), and ends this processing.

When the result of the determination in step S602 is that "order of most approvals" has been designated (order of most approvals in step S602), the server 101 sets the maximum approval total result as the variable M, and sets the priority number (in this case, 5) as the variable N. Then, if the variable K is smaller than the variable L (YES in step S616), an image having an image ID that corresponds to the variable K is acquired (step S617). Here, if the priority of the acquired image is at least as high as the variable N, and the approval information total result of the acquired image is at least M (YES in step S618), that image is added to the list (step S619), and then the variable K is incremented by "1"(step S620). Otherwise (NO in step S618), the variable K is incremented by "1" without adding the image to the list (step S620). Then, the flow again returns to the processing in step S616, and the processing of steps S616 to S620 is repeatedly executed.

Here, during the processing loop in steps S616 to S620, when the variable K and the variable L have the same value (NO in step S616), the variable M is decremented by "1", and processing is performed again from step S615. Moreover, when the processing of steps S614 to S621 is repeatedly executed, and the value of the variable N becomes "0", the variable M is decremented by "1", and processing is performed again from step S614. Thus, from among images having a high approval information total result, images having a high priority are added in order to the list. In the case of the table shown in FIG. 3, images are added to the list in the order of the following image names: image 1, image 10, image 3, image 4, image 6, image 2, image 5, image 9, image 8, image 7. When the processing up to step S622 ends, the server 101 stores this list (step S623), and ends this processing.

Next, a description is given of processing when the result of the determination in step S602 is that "approved by all users" or "at least a certain priority and approval information" has been designated, with reference to FIG. 15.

Here, when "at least a certain priority and approval information" has been designated (at least a certain priority and approval information in step S602), the server 101 sets the priority that has been designated as the variable N (step S701), and sets the approval information that has been designated as the variable M (step S702). Then the values of the variable K and the variable L are compared, and if the value of the variable K is smaller (YES in step S703), an image having an image ID that corresponds to the variable K is acquired (step S704). Here, if the priority of the acquired image is at least as high as the variable N, and the approval information total result of the acquired image is at least M (YES in step S705), that image is added to the list (step S706), and then the variable K is incremented by "1"(step S707). Otherwise (NO in step S705), the variable K is incremented by "1" without adding the image to the list (step S707). Then, the flow again returns to the processing in step S703, and the processing of steps S703 to S707 is repeatedly executed.

During the processing loop in steps S703 to S707, when the variable K and the variable L have the same value (NO in step S703), the server 101 stores this list (step S623), and ends this processing. Thus, it is possible to add to the list images that have at least a certain priority and approval information. For example, when the criteria is images that have a priority of at least "3" and approval information of at least "2", in the table shown in FIG. 3, images having the following image names are added to the list: image 1, image 3, image 4, image 10.

When "approved by all users" has been designated (approved by all users in step S602), the server 101 compares the values of the variable K and the variable L, and if the value of the variable K is smaller (YES in step S708), an image having an image ID that corresponds to the variable K is acquired (step S709). Then, if the acquired image has been approved by all users (YES in step S710), the image is added to the list (step S711), and then the variable K is incremented by "1" (step S712). Approval by all users indicates that the approval information total result is the maximum approvals number (in this case, 3).

In the determination in step S710, if the image has not been approved by all users (NO in step S710), the server 101 increments the variable K by "1" without adding the image to the list (step S712). Then, the flow again returns to the processing in step S708, and the processing of steps S708 to S711 is repeatedly executed.

During the processing loop in steps S708 to S711, when the variable K and the variable L have the same value (NO in step S708), the server 101 stores this list (step S623), and ends this processing. Thus, it is possible to add to the list images that have been approved by all users. In the case of the table shown in FIG. 3, images having the following image names are added to the list: image 1, image 3, image 4, image 6, image 10.

In the above description, approval information is either "approved" or "not approved", and is "not approved" when image usage was denied in the approval processing, and only the number of "approved" is totaled. However, there may also be cases where each user does not necessarily perform approval processing for all images. In such a case, a state in which approval processing has not been performed is treated as "not approved" and a case where image usage was denied is treated as "denied" and thus distinguished. In this case, it is possible to prevent usage in an album if the approval information of even one person indicates "denied". Also, it is possible to total the number of "denied", and not use the corresponding image for an album when "denied" is at least a certain number, or when the number of "denied" is greater than the number of "approved", and use the number of "denied" for image ranking.

According to the present embodiment as described above, the image supplier can view image (photograph) results and assign a priority, and the image viewer can confirm the result of a photograph in which they appear and determine whether to approve or deny posting of the image to an album. Thus, it is possible to create an album in which the wishes of both the image supplier and the wishes of the image viewer are reflected.

Also, by changing the image selection method, it is possible to create a plurality of albums of different versions. For example, when selection of images of higher priority is adopted as the image selection method, it is possible to create an informal album in which interesting images are collected. Also, when selection of images that have been approved by many users is adopted as the image selection method, it is possible to create a serious album that will be consented to by all members of a group.

Also, by deciding the image selection method in advance, it is possible to change the order of images to an order of highest likelihood of being used in the album. Also, it is possible to delete images having no likelihood of being used from the list. Thus, the work of image approval processing can be reduced. Also, because it is possible to adopt a layout having a cover page or facing images for images that both have a high priority and have been approved by many users, it is possible to create an album that reflects the wishes of the users.

Above is an example of a representative embodiment of the present invention, but the present invention is not limited to the embodiment described above and shown in the drawings. The present invention can also be modified within a scope that does not change the gist of the invention.

For example, in the embodiment described above, "at least a certain priority and approval information" is described as an example of an image selection method, but this condition is not a limitation. For example, a condition may be added such as that at least either one of the priority and the approval information is at least a certain level.

A system, an apparatus, a method, a program, a storage medium, or the like, for example, can be adopted as the mode of the present invention. Specifically, the present invention may be applied to a system configured from a plurality of devices, or may be applied to an apparatus configured from a single device.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-241880 filed on Oct. 20, 2009, which is hereby incorporated by reference herein in its entirety.

What is claimed is:

1. An information processing apparatus, comprising:
a processor;
a memory;
an image management unit configured to manage a plurality of images;
a priority information management unit configured to manage, associated with each image managed by the image management unit, priority information indicating a priority that has been instructed by a supplier of the image;
an approval counting unit configured to count, associated with each image managed by the image management unit, the number of approvals indicating the number of viewers who have approved sharing of the image;
a selection unit configured to select images from among the plurality of images managed by the image management unit, based on the priority information and the number of approvals;
a determination unit configured to determine a layout of each of the respective images selected by the selection unit based on the priority information and the number of approvals for each respective image; and
a creation unit configured to create a document by arranging each of the selected images based on the determined layout.

2. The information processing apparatus according to claim 1, wherein the selection unit performs selection of the images according to an image selection method of any of:
selecting images in order of highest priority,
selecting images in order of most approvals,
selecting images in order of highest priority and selecting images in order of most approvals when images have the same priority,
selecting images in order of most approvals, and selecting images in order of highest priority when images have the same number of approvals, and
selecting images for which at least either one of the priority and the approval is at least a certain level.

3. The information processing apparatus according to claim 2, wherein when a viewer performs the approval, a display order of the images in a display screen is determined based on the image selection method selected by the selection unit.

4. A processing method in an information processing apparatus having at least a processor, a memory and a management unit that manages a plurality of images, the method comprising:
managing, associated with each of the plurality of managed images, priority information indicating a priority that has been instructed by a supplier of the image;
counting, associated with each managed image, the number of approvals indicating the number of viewers who have approved sharing of the image;
selecting images from among the plurality of managed images, based on the priority information and the number of approvals;
determining a layout of each of the respective images selected by the selecting step based on the priority information and the number of approvals for each respective image; and
creating a document by arranging each of the selected images based on the determined layout.

5. A non-transitory computer-readable storage medium storing code of a computer program for causing an information processing apparatus having at least a processor, a memory and an image management unit that manages a plurality of images to function execute:
managing, associated with each image managed by the image management unit, priority information indicating a priority that has been instructed by a supplier of the image;
counting, associated with each image managed by the image management unit, the number of approvals indicating the number of viewers who have approved sharing of the image;
selecting images from among the plurality of images managed by the image management unit, based on the priority information and the number of approvals;
determining a layout of each of the respective images selected by the selection unit based on the priority information and the number of approvals for each respective image; and
creating a document by arranging each of the selected images based on the determined layout.

* * * * *